United States Patent
Nolan et al.

(10) Patent No.: US 9,942,966 B2
(45) Date of Patent: Apr. 10, 2018

(54) CONTROL OF LIGHTING

(71) Applicant: PHILIPS LIGHTING HOLDING B.V., Eindhoven (NL)

(72) Inventors: Julian Charles Nolan, Eindhoven (NL); Matthew John Lawrenson, Eindhoven (NL); Hilbrand Vanden Wyngaert, Eindhoven (NL); Alexander Henricus Waltherus Van Eeuwijk, Eindhoven (NL); Huon Urbald Ogier Norbert Van De Laarschot, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/512,568

(22) PCT Filed: Aug. 31, 2015

(86) PCT No.: PCT/EP2015/069847
§ 371 (c)(1),
(2) Date: Mar. 19, 2017

(87) PCT Pub. No.: WO2016/045911
PCT Pub. Date: Mar. 31, 2016

(65) Prior Publication Data
US 2017/0231063 A1    Aug. 10, 2017

(30) Foreign Application Priority Data
Sep. 25, 2014    (EP) .................................... 14186322

(51) Int. Cl.
*H05B 37/02* (2006.01)
*G06K 9/00* (2006.01)
*G06T 7/73* (2017.01)

(52) U.S. Cl.
CPC ..... *H05B 37/0227* (2013.01); *G06K 9/00604* (2013.01); *G06T 7/74* (2017.01); *G06T 2207/30201* (2013.01)

(58) Field of Classification Search
CPC ... G06K 9/00; G06K 9/00604; H05B 37/0227
(Continued)

(56) References Cited

U.S. PATENT DOCUMENTS

2006/0110008 A1   5/2006  Vertegaal et al.
2010/0328444 A1*  12/2010 Blixt ...................... A61B 3/113
                                                          348/78

(Continued)

FOREIGN PATENT DOCUMENTS

JP         03203951 B2    9/2001
WO      WO199721188 A1    6/1997

OTHER PUBLICATIONS

C. Nitschke, et al., "Corneal Imaging Revisited: An Overview of Corneal Reflection Analysis and Applications", IPSJ Transactions on Computer Vision and Applications, vol. 5, Jan. 2013), pp. 1-18.

*Primary Examiner* — Tung X Le

(57) ABSTRACT

A controller for controlling a plurality of lighting devices to emit light, each in dependence on at least one respective setting, the controller being configured to perform operations of: obtaining image data representing a corneal image, captured by a camera, formed by light reflected into the camera from at least a portion of at least one cornea of a user; based on the corneal image, automatically determining updates to the respective settings of one or more of the lighting devices; controlling said one or more lighting devices in accordance with the updates; and repeating these steps of obtaining, determination and control so as to dynamically adapt the settings of the lighting devices as the user moves.

15 Claims, 3 Drawing Sheets

(58) Field of Classification Search
USPC .............................. 348/78; 382/103; 351/209
See application file for complete search history.

(56) References Cited

U.S. PATENT DOCUMENTS

| | | | |
|---|---|---|---|
| 2011/0182472 A1* | 7/2011 | Hansen | A61B 3/113 |
| | | | 382/103 |
| 2011/0316828 A1 | 12/2011 | Shirbabadi | |
| 2014/0368687 A1* | 12/2014 | Yu | G06K 9/00604 |
| | | | 348/222.1 |
| 2015/0085097 A1* | 3/2015 | Larsen | H04N 5/33 |
| | | | 348/78 |
| 2016/0227113 A1* | 8/2016 | Horesh | G03B 15/03 |

* cited by examiner

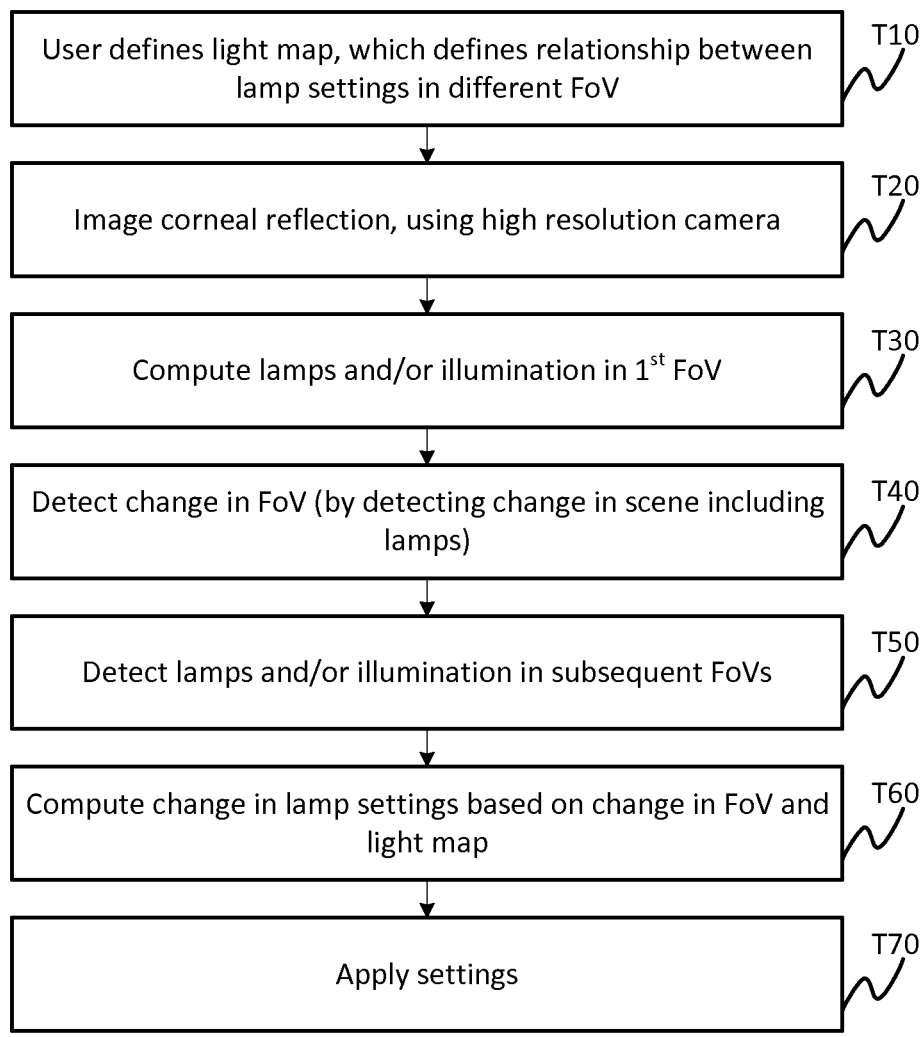

CONTROL OF LIGHTING

CROSS-REFERENCE TO PRIOR APPLICATIONS

This application is the U.S. National Phase application under 35U.S.C. § 371 of International Application No. PCT/EP2015/069847, filed on Aug. 31, 2015, which claims the benefit of European Patent Application No. 14186322.5, filed on Sep. 25, 2014. These applications are hereby incorporated by reference herein.

TECHNICAL FIELD

The present disclosure relates to techniques for automatically and dynamically controlling one or more lighting devices.

BACKGROUND

A number of techniques exist for controlling one or more lighting devices such as the luminaires illuminating a room or other environment, e.g. to switch the lights on and off, dim the light level up and down, or set a colour setting of the emitted light.

One technique is to use an application running on a user terminal such as a smartphone, tablet, or laptop or desktop computer. A wired or wireless communication channel is provided between the user terminal and a controller of the lighting device(s), typically an RF channel such as a Wi-Fi, ZigBee or Bluetooth channel in the case of a mobile user terminal. The application is configured to use this channel to send lighting control requests to the controller, based on manual user inputs entered into the application running on the user terminal. However, this is not very user friendly.

Another technique for controlling lighting devices is gesture control. In a system employing gesture control, the system is provided with suitable sensor equipment such as a 2D video camera, a stereo video camera, a depth-aware (ranging) video camera (e.g. time-of-flight camera), an infrared or ultrasound based sensing device, or a wearable sensor device (e.g. a garment or accessory incorporating one or more accelerometers and/or gyro sensors). A gesture recognition algorithm running on the control receives the input from the sensor equipment, and based on this acts to recognise predetermined gestures performed by the user and map these to lighting control requests. This is somewhat more natural for the user, but still requires an explicit, manual user input.

Some techniques do exist for automatically controlling the lights in a building or room, or the like. These involve detecting the presence of a user by means of a presence detector such as a passive infrared sensor or active ultrasound sensor. However, these techniques tend to be quite crude in that they only detect whether or not a user is present in a certain predefined zone of the building or room, and simply turn the lights on or off or dim them up and down in dependence on whether or not present.

SUMMARY

It would be desirable to find an alternative technology for automatically controlling one or more lighting devices to be controlled by a user.

Corneal imaging is a newly emerging technology in which a high resolution picture of a person is captured by a camera, and the reflection seen in that person's eye or eyes is extracted in order to determine what is in the field of view.

The inventors have identified that this (known) technology has an application to lighting control, and particularly to the automatic, dynamic control of lighting. Accordingly, the following discloses a controller, system, method and computer program product which control a lighting system based on the image of all or part of the lighting system or illuminated environment reflected in the cornea of a user, as the user moves such that the reflected corneal image changes. Such functionality is obtained by imaging the cornea of a user using a high resolution camera such that the reflected scene is obtained. The control is dynamic in that new images are acquired as the reflected scene changes, such that the illumination can be determined for each scene. A new illumination setting may then be computed.

Hence according to one aspect disclosed herein, there is provided a controller for controlling a plurality of lighting devices to emit light, each in dependence on at least one respective setting, the controller being configured to perform operations of: obtaining image data representing a corneal image, captured by a camera, formed by light reflected into the camera from at least a portion of at least one cornea of a user; based on the corneal image, automatically determining updates to the respective settings of one or more of the lighting devices; controlling said one or more lighting devices in accordance with the updates; and repeating said obtaining, determination and control so as to dynamically adapt the settings of the lighting devices as the user moves. According to further aspects disclosed herein, are provided a corresponding system, method, and a computer-program product.

Eye-tracking or gaze-tracking can be used in this respect to determine in which direction a user is looking. In the field of eye-tracking and gaze-tracking an image of an eye is used to determine relative position of an eye, for example to a user's head to determine if someone is looking to the left or the right; or relative to a user's surroundings to determine what area in the user's surroundings the user is looking at. One would need a map of the user's surroundings to determine what object a user is looking at using these technologies. Furthermore, it is the detection of the position of the center of the user's eye, i.e. the pupil, that determines the user's gaze. This is different from corneal imaging, where based on which of the lighting devices appear within and/or affect the corneal image, automatically updates are determined to the respective settings of one or more of the lighting devices.

In embodiments, the controller may be configured such that said determination comprises: automatically determining the updates to the respective settings based on a position of the one or more lighting devices relative to corneal image.

For instance, the controller may be configured such that said determination in dependence on position comprises: automatically determining the updates to the respective settings of the one or more lighting devices in dependence on whether directly appearing in the corneal image. Alternatively or additionally, the controller may be configured such that said determination in dependence on position comprises: automatically determining the updates to the respective settings of the one or more lighting devices in dependence on whether indirectly contributing to the light forming the corneal image.

Further, it is not only possible to just capture the corneal image, but in embodiments the user's field of view (FoV) within the corneal image may also be estimated, or even the user's central region of vision and/or peripheral vision.

Based on a user's gaze, lighting appearing in or affecting in his or her FoV, central region of vision or peripheral vision can thus be estimated and processed such that the effect of these may be taken into consideration.

Hence in embodiments, the controller may be configured to determine a field of view of the user within the corneal image, and may be configured such that said determination in dependence on position comprises: automatically determining the updates to the respective settings of the one or more lighting devices in dependence on whether appearing inside the field of view, and/or in dependence on whether contributing to the light inside the field of view. In some embodiments, the controller may be configured such that said determination in dependence on position comprises: automatically determining the updates to the respective settings of the one or more lighting devices in dependence on whether appearing inside the central region, and/or in dependence on whether contributing to the light inside the central region. Alternatively or additionally, the controller may be configured such that said determination in dependence on position comprises: automatically determining the updates to the respective settings of the one or more lighting devices in dependence on whether appearing in the peripheral region, and/or in dependence on whether contributing to the light inside the peripheral region.

For example, the updates may comprise: setting to ON, or a first light output level, any of the lighting devices inside the corneal image, field of view or central region; and setting to OFF, or a second light output level lower than the first level, any of the lighting devices outside the corneal image, field of view or central region respectively.

In one example, the updates may comprise maintaining constant values for the settings of any of the lighting devices currently appearing in the corneal image, field of view or central region as the user moves, and/or maintaining constant values for the settings of any of the lighting devices currently contributing to the light in the corneal image, field of view or central region as the user moves.

In further embodiments, the new lighting setting(s) may be computed, e.g., according to user preferences, light setting associated with an object in the users corneal image or FoV, current and/or previous light settings which have been observed in the user's corneal image, and/or other users' light settings.

For instance, the controller may be configured such that said determination comprises one or more of: (a) automatically determining the updates in response to detection of a predetermined object appearing in the corneal image, field of view or central region; (b) automatically determining the updates based on a measure of contrast measured in the corneal image, field of view or central region; and/or (c) automatically reducing the intensity of one or more the lighting devices in response to detecting that the intensity in the corneal image, field of view or central region is a above a threshold.

In embodiments, the controller may be arranged to read one or more preconfigured lighting control rules from a database, being preconfigured by a user; and the updates to be applied may be determined in accordance with the one or more preconfigured lighting control rules.

BRIEF DESCRIPTION OF THE DRAWINGS

To assist understanding of the present disclosure and to show how embodiments may be put into effect, reference is made by way of example to the accompanying drawings in which:

FIG. 3 is a flow chart of a method of automatically and dynamically controlling lighting devices, and FIGS. 4A and 4B schematically illustrate a scheme for automatically and dynamically updating the settings of lighting devices as a user moves within an environment.

DETAILED DESCRIPTION OF EMBODIMENTS

Figure 1:
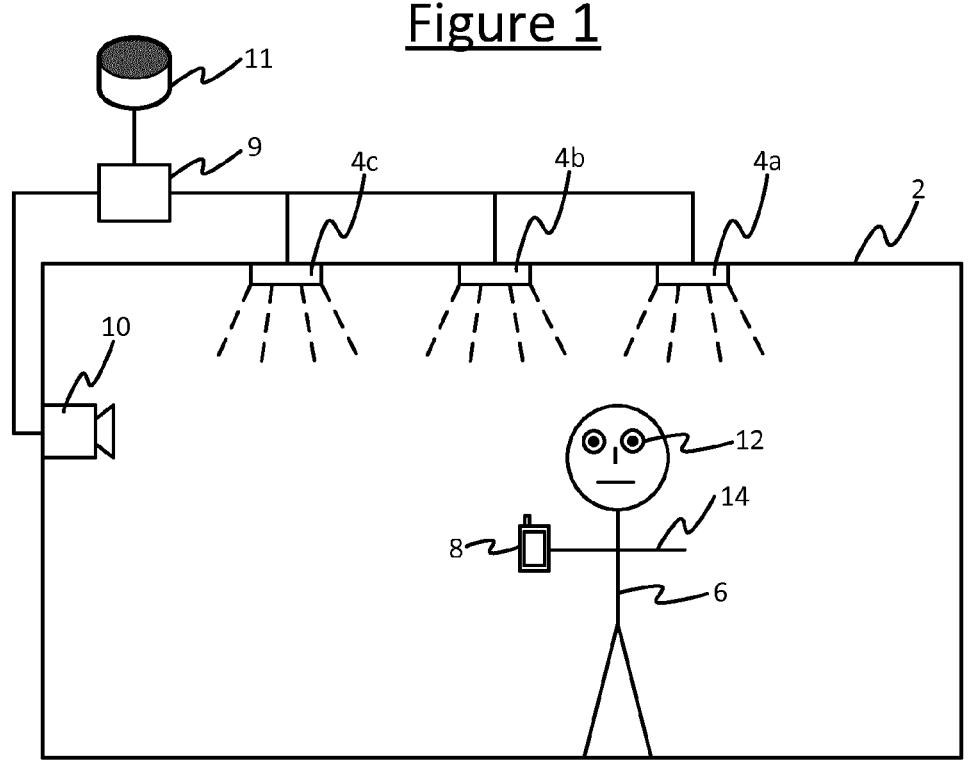
FIG. 1 is a schematic diagram of an environment including a lighting system and user.

Imaging has evolved over the past decades, with higher and higher resolution sensors becoming available. For instance, some modern smartphones now offer resolutions of over 40 megapixels together with sophisticated lens systems. Increasing pixel resolutions helps enable corneal imaging, which requires high pixel resolution due to the target image being reflected from only the small area of the cornea—often from a distance. Corneal imaging has been documented by Columbia University and others. See for example:

"Corneal Imaging System: Environment from Eyes"; KO NISHINO, Department of Computer Science, Drexel University, 3141 Chestnut Street, Philadelphia, Pa. 19104; and SHREE K. NAYAR, Department of Computer Science, Columbia University, 1214 Amsterdam Avenue MC 0401, New York, N.Y. 10027; Published April 2006; Springer Science+Business Media, Inc.; International Journal of Computer Vision 70(1), 23-40, 2006; DOI 10.1007/s11263-006-6274-9. E.g. FIGS. 1, 15, 17, 18 and 19 of this citation give an idea of the level detail that can now be captured from the cornea using modern techniques.

See also: "Eyes for Relighting", Ko Nishino and Shree K Nayer, Department of Computer Science, Columbia University, 2004, ACM 0730-0301/04/0800-0704.

Corneal imaging in turn enables a number of product opportunities across different market sectors including, as recognised herein, lighting control.

Accordingly, the following discloses a controller, system, computer-program and method which control lighting devices based on an iterative process of:

capturing a corneal image (i.e. an image of the reflection in the cornea which shows what the user sees);

determining (e.g. based on coded light or the colour of the emitted light) which lighting devices are in the user's field of view (FoV) based on the corneal image, or which have an effect on the user's FoV (note that in embodiments the lighting device itself does not necessarily have to be in the user's field of view, but rather only the light emitted has to be in the user's FoV);

determining light settings (e.g. based on user profile) to be applied to identified lighting devices; and controlling lighting devices according to rules (previously configured, e.g. by the user).

Examples of These Rules Are:

a lighting effect moves along with where the user looks, e.g. the user looks to the right side of room which in response is then illuminated in some particular colour such as purple, and when the user subsequently starts to look at the left side of the room, this is now illuminated in a purple hue;

turn off lighting devices that are not in the user's FoV (or ones that do not contribute to the user's FoV—some lighting devices might not be seen by the user, while the light effect they create is still within the user's FoV, e.g. being reflected from a wall).

N. B. generally the whole corneal image is not actually seen by the user, i.e. the cornea reflects more than is projected through the pupil onto the user's retina. Hence in embodiments, the corneal image is processed to estimate the user's field of view within the corneal image. However, while embodiments described herein may be exemplified in terms of the FoV, more generally, the process described herein could be applied based on a determination as to which lighting devices appear within and/or affect the complete corneal image (e.g. as an approximation of the user's vison), or a determination specifically as to which lighting devices appear within and/or affect a smaller sub-region within the FoV such as the central region of the user's FoV (e.g. corresponding to the fovea or macula) and/or peripheral vision (e.g. outside the fovea or macula), or any combination of such considerations.

FIG. 1 illustrates an example lighting system in accordance with embodiments of the present disclosure. The system is installed or disposed in an environment 2, e.g. an interior space of a building comprising one or more rooms and/or corridors, or an outdoor space such as a garden or park, or a partially covered space such as a gazebo, or indeed other any other space such as the interior of a vehicle. The system comprises a controller 9 and one or more controllable lighting devices 4 coupled to the controller 9 via a wireless and/or wired connection, via which the controller 9 can control the lighting devices 4. Three lighting devices 4a, 4b and 4c are illustrated in FIG. 1 by way of example, but it will be appreciated that in other embodiments the system may comprise other numbers of lighting devices 4 under control of the controller 9, from a single lighting device up to tens, hundreds or even thousands. In embodiments, each of the lighting devices 4 represents a different luminaire for illuminating the environment 2, or a different individually controllable light source (lamp) of a luminaire, each light source comprising one or more lighting elements such as LEDs (a luminaire is the light fixture including light source(s) and any associated housing and/or socket—in many cases there is one light source per luminaire, but it is not excluded that a given luminaire could comprise multiple independently controllable light sources). For example each luminaire or light source 4 may comprise an array of LEDs, a filament bulb, or a gas discharge lamp.

The controller 9 represents a functional element that may be implemented in the form of one or more physical controller units at one or more physical locations. For example, the controller 9 may be implemented as a single central controller connected to the light sources 4 via a lighting network, or may be implemented as a distributed controller, e.g. in the form of a separate controller unit integrated into each of the lighting devices 4. The controller 9 could be implemented locally in the environment 2, or remotely, e.g. from a server communicating with the lighting devices 4 via a network such as the Internet, or any combination of these. Further, the controller 9 may be implemented in software, dedicated hardware circuitry, or configurable or reconfigurable circuitry such as a PGA or FPGA, or any combination of such means. In the case of software, this takes the form of code stored on one or more computer-readable storage media and arranged for execution on one or more processors of the controller 9. For example the computer-readable storage may take the form of e.g. a magnetic medium such as a hard disk, or an electronic medium such as an EEPROM or "flash" memory, or an optical medium such as a CD-ROM, or any combination of such media.

The system further comprises a high resolution camera 10 coupled to the controller 9 via a local or remote wired and/or wireless connection. This camera 10 may be a stand-alone device, or integrated into another product such as mobile device or television. Either way, it is positioned at a suitable location and orientation to capture at least one picture of the environment 2 such that, when a (human) user 6 is present, at least a part of at least one eye 12 of the user 6 is visible in the picture; and particularly, such that the picture includes an image of at least a part of at least one cornea 18 of the user 6. In embodiments multiple such cameras may be used to cover a wider environment, but by way of example the following will be described in relation to one camera 10.

Figure 2:
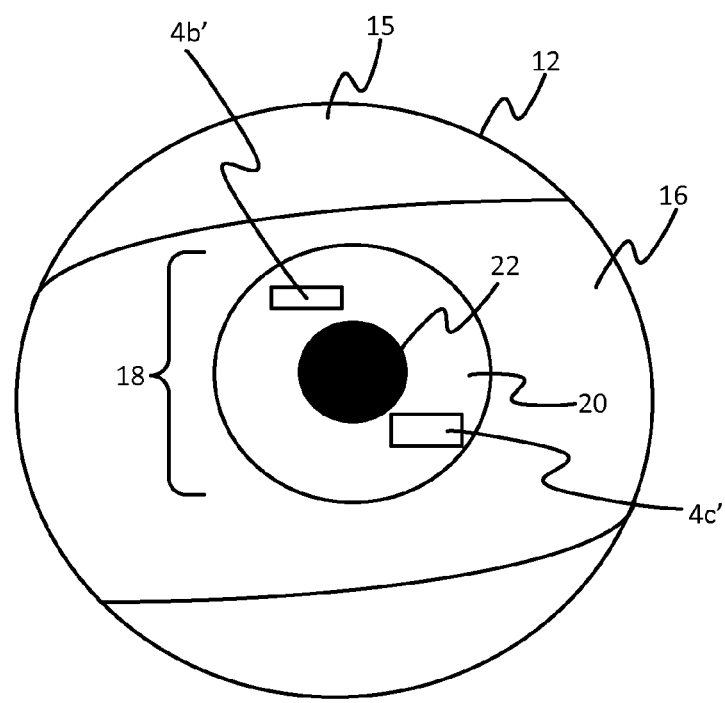
FIG. 2 is a schematic diagram of a user's eye including corneal reflections of lighting devices.

FIG. 2 gives a simplified illustration of the human eye 12. The eye 12 comprises the sclera (white of the eye) 16, the iris 20, the pupil 22 and the cornea 18. The eye 12 may be partially covered by the eyelids 15. The cornea 18 is the transparent part of the eye covering the iris 20 and pupil 22 (and the anterior chamber, not shown, which sits in front of the iris 20 and pupil 22 but behind the cornea 18). The cornea 18 is an optical component of the eye 12 which, in part, is responsible for refracting light through the pupil 22 in order to form an image on the retina of the eye (not shown). The cornea 18 is also highly reflective.

Note that the cornea 18 does not extend over the sclera 16, which is not as reflective. The sclera 16 is separated from (and attached to) the sclera 16 by the limbus.

As will be exemplified in more detail shortly, the camera 10 is used by the controller 9 to perform imaging of the cornea 18 such that the scene reflected from the cornea 18 is obtained. With a high enough resolution camera 10 for the circumstance (e.g. given the distance from the camera 10 to the user 6, and angle of the user's cornea 18 relative to the camera 10), the detail of individual objects in the scene can be resolved—e.g. see again the publications by Nishino and Nayer cited above. Hence if one or more of the lighting devices 4 are within the solid angle reflected by the cornea 18, these will be visible in the corneal image. By way of example, FIG. 2 shows reflections 4b' and 4c' of two of the lighting devices 4b and 4c respectively reflected from the cornea 18.

Thus from the corneal image, the controller 9 is able to estimate which of the lighting devices 4 (if any) are present in the corneal image, and/or which of the lighting devices 4 are present in the user's field of view within the corneal image, the user's central region of vision, and/or the user's peripheral vision.

Figure 4A:
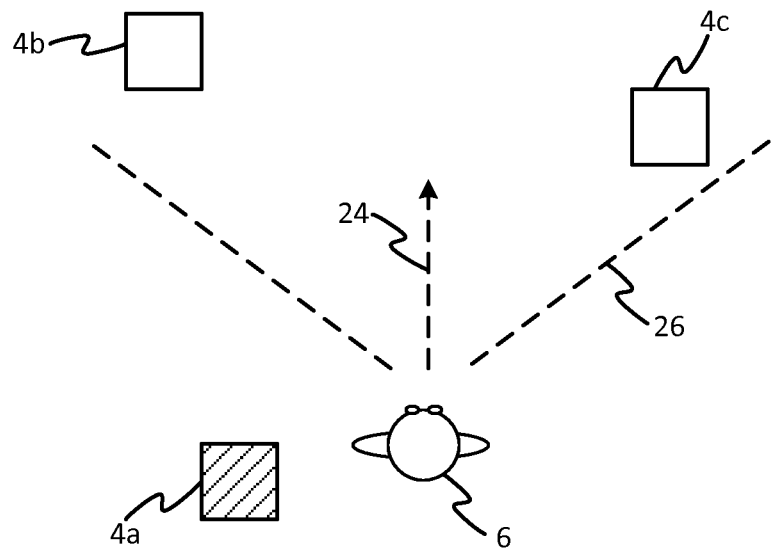
Figure 4B:
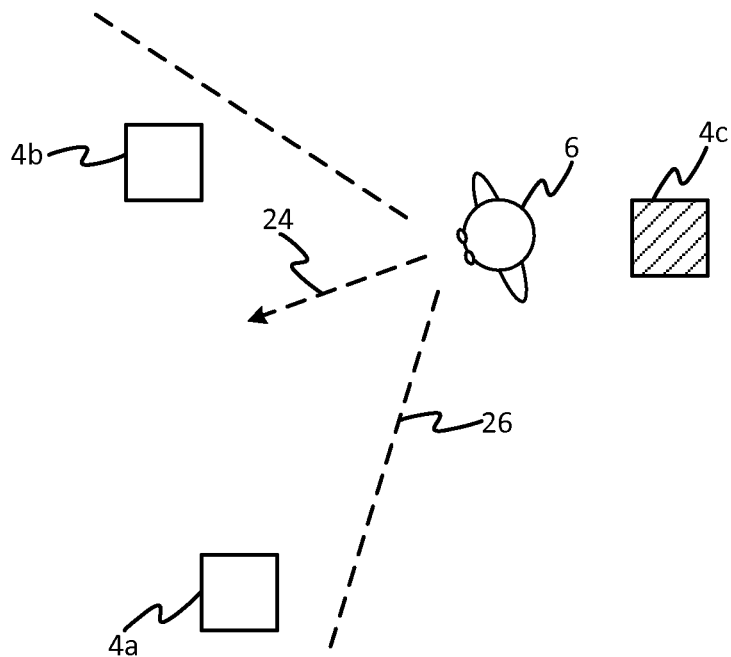

The operation of the controller 9 is now discussed in more detail in relation to the flow chart of FIG. 3, and the diagrams of FIGS. 4A and 4B.

At step T10, the user 6 (or indeed a different user, e.g. a system administrator) defines a light map 11, which defines the relationship between lamp settings in different fields of view (FoVs). The light map is a database of any size from a small look-up table upwards, and may be implemented in any suitable storage medium or media, e.g. a local storage of the controller 9, or a local or remote server which the controller 9 access via a network. Further, the light map 11 may be implemented either at a single physical storage unit or distributed over multiple physical storage units.

The light map 11 defines how the user 6 wishes to vary lighting devices 4 within his or her environment 2 as he or she changes his or her FoV (or how another user such as administrator wishes the lighting devices 4 to be varied with that the FoV of the user 6). The light map 11 may comprise of a number of templates each comprising one or more instructions, or a detailed set of instructions, associating control information with lighting devices 4 and one or more possible circumstances that may be detected based on the corneal images.

E.g. the light map 11 may list, for each lighting device 4 in the system, what setting or settings is or are to be applied to that particular lighting device if it falls within the FoV, and/or what setting or settings is or are to be applied to that particular lighting device if it falls outside the FoV (and/or what setting or settings is or are to be applied to that lighting device if it falls within and/or outside the complete corneal image, central region of vision and/or peripheral vision). Or the light map 11 could define a rule that is to be applied to all lighting devices 4 in the system, the rule defining what setting or settings is or are to be applied to any lighting device the falls within the FoV, and/or what setting or settings is or are to be applied to any lighting device if it falls outside the FoV (and/or what setting or settings is or are to be applied to any lighting device if it falls within complete corneal image, central region of vision and/or peripheral vision)

As an example, the user 6 may select a template defining that as he or she changes his or her FoV, the lighting settings are varied so as to allow the same lighting settings to be maintained in the FoV irrespective of the orientation of the user—i.e. so a particular lighting effect follows the user's gaze, e.g. so any lights in the user's FoV are always ON, dimmed up to a certain level, or emitting with a certain colour. Optionally, the lighting devices behind the user 6 (and therefore not in the user's FoV) are also controlled, e.g. so the lighting devices outside the user's FoV are always OFF, dimmed down to a certain level, or emitting with a certain other colour.

As another example, a template in the light map 11 may describe the properties of each lighting device 4 when in the central region of the FoV of the user 6, and the properties of each lighting device 4 when in the peripheral vision of the user 6.

At step T20, the controller 9 images the corneal reflection from the cornea 18 of the user 6, using the high resolution camera 10. The controller 9 tracks the cornea 18, and computes the scene which is being reflected in the image of the cornea 18, e.g. using the techniques disclosed by Nishino and Nayer.

At step T30, the controller 9 determines which of the one or more lighting devices 4 are present in the scene imaged by the user's cornea 18. The lighting devices present in the reflected scene are determined by processing the image (using, for example, the relative changes in intensity across the scene), and are identified so they can be individually addressed. This may be achieved in a number of ways.

For example, in embodiments the lighting devices 4 may be identified based on coded light. In this case, each of the lighting devices 4 is configured to emit its respective light modulated (in embodiments at frequency beyond human perception) with a different respective embedded ID that is unique amongst the others in the system, e.g. each modulated with a different modulation frequency, or a different digital code. This frequency or code can then be detected from the reflection 4b' 4c' of each lighting device 4b, 4c present in the corneal image (in embodiments over multiple frames). The coded light signal may be demodulated by the controller 9, or by an embedded coded light function in the camera 10.

In another example, the lighting devices 4b, 4c in the corneal image may be identified through the positions of the lighting devices 4 in the corneal image. E.g. given the known geometry of the human cornea 18, the controller 9 can calculate the location or orientation of the lighting devices 4b, 4c appearing in the corneal image relative to the user 6, and/or relative to the camera 10 which may also appear reflected in the corneal image. Given knowledge of the "absolute" location or orientation of the user 6 and/or camera 10 (i.e. relative to the environment 2 or some other known frame of reference), the controller 9 can then calculate the absolute location or orientation of the lighting devices 4. Given a database or table mapping IDs of the lighting devices 4 to their absolute positions, the controller 9 can then determine the identity of the reflected devices 4b, 4c.

In further examples, the lighting devices 4b, 4c in the corneal image may be identified through distinct characteristics of the lighting devices 4 (e.g. unique colour spectrum, intensity etc.), or, or by polling individual lamps (perhaps imperceptibly) using the controller 9.

Note, according to Nishino and Nayar, the "corneal field of view" (i.e. the complete corneal image consisting of everything reflected by the cornea 18) is always greater than the user's field of view (the part of the corneal image projected onto the retina). I.e. not everything reflected by the cornea 18 is refracted through the pupil 22. Nishino and Nayar therefore provide an algorithm for computing the user's field of view (FoV) from the corneal image.

Accordingly, in embodiments of the present disclosure, the controller 9 may be configured to process the corneal image to identify which of the lighting devices 4 (if any) appears specifically in the user's FoV, either instead of or in addition to identifying which appear in the corneal image more generally. For instance the condition for being identified for control may be specifically that the lighting device 4 is inside the FoV, not just inside the corneal image; or alternatively the manner in which the identified devices are controlled may be dependent on whether identified as in the FoV or just in the corneal image but outside the FoV (e.g. the user input affects those in the FoV more strongly than those that are just in the corneal image but not the FoV).

Furthermore, note that the human field of view consists of a central region and peripheral vision, being distinct in that they have different densities of photoreceptors in the corresponding regions of the retina. Different biological definitions are possible, e.g. the central region may correspond to the macula or fovea—the macular or foveal region of retina—while the peripheral region may correspond to the rest of the retina. Accordingly, in embodiments of the present disclosure, the controller 9 may be configured to process the corneal image to identify which of the lighting devices 4 (if any) appears specifically in the user's central vision region, and/or which specifically appear in the peripheral vision region. For instance the condition for being identified for control may be specifically that the lighting device 4 is inside the central region of the user's FoV, not just in the user's peripheral vision; or alternatively the manner in which the identified devices 4 are controlled may be dependent on whether identified as in the central region of the FoV or just in the peripheral region of the FoV (e.g. the user input affects those in the central region more strongly than those that are just in the peripheral region).

Embodiments herein may be described in terms of the FoV, but it will be understood that anywhere in this description that describes identifying which lighting devices 4 are present or appear in the FoV, or the like, this may alternatively or additionally apply to determining whether present or appearing in the complete corneal image, the central region of user's FoV, and/or the peripheral vision region of the user's FoV. For example, the complete corneal image could be used as an approximation of the user's vision, to avoid complex processing operations involved in computing the FoV.

Further, in embodiments, the controller 9 may use the corneal image to identify not just which of the lighting devices 4 appear directly in the corneal image, FoV, central region and/or peripheral vision; but also which of the lighting devices 4 indirectly contribute to the light that is reflected from the cornea 18 into the camera 10. Indirect here means the lighting device 4 itself is behind the user 6 and outside the solid angle covered by the cornea 18, but some light from that device 4 still arrives via reflection (e.g. diffuse reflection) from some other, additional surface such as a white wall prior to the reflection from the cornea 18. For example, in the case where the lighting devices 4 are identified by the coded light they emit, or by characteristics such as spectrum, this information may still be detectable from the indirect light.

Anywhere in this description that describes identifying which lighting devices 4 are present or appear (i.e. directly appear) in the corneal image, FoV, central vision region or peripheral vision region, or the like, this may alternatively or additionally apply to identifying which lighting devices 4 contribute light into the corneal image, FoV, central vision region and/or peripheral vision region.

Note that the act of identifying lighting devices 4 which are in the corneal image comprises both identifying the fact that those one or more lighting devices 4 are in the corneal image, and determining their identity. Similarly, the act of identifying lighting devices 4 which are in a certain region such as the FoV, central vision region or peripheral vision region comprises both identifying the fact that those one or more lighting devices 4 are in the specific region in question, and determining their identity.

Note also, the condition for a lighting device 4 being identified as in or inside the corneal image, FoV, central region or peripheral region could be that it appears wholly inside the coneal image, FoV, central region or peripheral region (in which case the device 4 is considered outside if any of it is outside); or alternatively the condition for being identified as in or inside the corneal image, FoV, central region or peripheral region could be that at least a part of the lighting device 4 appears inside the corneal image, FoV, central region or peripheral region respectively (in which case it is considered outside only wholly outside). As another alternative, different rules could be defined for the lighting devices 4 covering the different contingencies of whether identified as a wholly inside of the corneal image, FoV or region, wholly outside, or overlapping.

Whatever the criterion or criteria for being identified, each of the identified lighting devices 4 in the corneal image, FoV, central region and/or peripheral vision area is then tagged with its respective associated settings (which may be determined from the lighting controller 9, or estimated through the image of the scene including the lighting device 4.

At step T40, the controller 9 detects a change in the FoV of the user 6. The change in FoV may be detected in a number of ways, such as detecting a change in the scene captured in the corneal image (including light sources), or detecting a change in user orientation by some other means such as an image recognition algorithm applied to the wider picture captured by the camera 10, or a separate motion sensor.

In response, at step T50, the controller 9 detects which of the lighting devices 4 are present in subsequent FoVs, including determining their identities. Similarly to step T30, the image of the scene reflected in the cornea 18 is captured, and the FoV calculated e.g. as described by Nishino and Nayer. Lighting devices 4 present in the scene are detected (using, for example, the relative changes in intensity across the scene), and a unique identifier of each of the the lighting devices in the scene is ascertained so they can be individually addressed. Again this may be achieved in a number of ways such as: based on coded light; through a known location and/or orientation of the user (and therefore FOV) and lighting devices 4; through distinct characteristics of the lamps (colour, intensity etc.); or by polling individual lamps (perhaps imperceptibly) using the lamp control system. Each of the lighting devices 4 in the FoV is then tagged with its respective associated settings.

At step S60, the controller 9 computes a change of settings for one or more of the lighting devices 4 based on the light map 11 and the change in FoV or the new FoV. This may be achieved by determining the settings of the lighting devices 4 originally in the user's FoV, determining the current settings and identities of lighting devices 4 in the user's new FoV, and determining the required new settings of identified lighting devices 4 in the user's new FoV. This is performed using the light map 11, and using the function described by this to compute a new absolute setting for the lighting devices in the user's new FoV.

In embodiments, a similar process may be applied for determine lighting devices now outside the user's FoV, and for determining how their settings should be set based on another function described by the light map 11. Or in alternative or additional embodiments, an analogous process may be applied for controlling the settings of lighting devices detected to be in the user's central region of vision, and those detected to be in the user's peripheral vision.

Having computed the new absolute level(s), the controller 9 then computes the change necessary between the lamps existing settings and their required new settings. Alternatively it is not necessary to compute the new settings in terms of a change relative to previous settings, but rather the controller 9 may simply determine the new absolute settings directly (based on the new FoV and the rules(s) in the light map 11).

Note also that step T40 is not necessary in all possible embodiments. E.g. instead of detecting a change in the user's FoV, the controller 9 may perform the identification of lighting devices in the FoV (step T50) periodically, i.e. at regular intervals.

FIGS. 4A and 4B illustrate an example of a rule that may be defined by the light map 11 and applied in accordance with the process described above. In this example, there are three lighting devices 4a, 4b, 4c in the system, each at a different position around the user in the horizontal plane. The rule in the light map 11 defines that any lighting device 4 detected in the user's FoV 26 (or other optically-defined region relative to the user's corneal image 18, e.g. central region of vision or entire corneal image) should be turned ON, or set to a first dimming level; while any lighting device 4 detected outside this region should be turned OFF, or dimmed to a second level lower than the first level. Imagine that the user 6 is currently oriented with the direction of his or her gaze 24 directed such that the FoV 26 encompasses lighting devices 4b and 4c, but not 4a. The controller 9 detects this from the corneal image and, based on the rule it looks up in the light map 11, accordingly controls lighting devices 4b and 4c to be ON (or dimmed to the first level) and controls lighting device 4a to be OFF (or dimmed to the second level). Imagine the user then turns the direction of his or her gaze 24 to a different orientation, such that the FoV 26 now encompasses lighting devices 4a and 4b but not 4c.

The controller 9 detects this and accordingly, based on the rule, controls lighting devices 4a and 4b to be ON (or dimmed to the first level) and controls lighting device 4c to be OFF (or dimmed to the second level).

A similar process could be used to control the colour of the lights, e.g. any lighting devices 4 in the FoV 26 are set to a certain colour, while any lighting devices outside are turned OFF or set to a certain other colour.

The above has described a process whereby the lighting devices r4 are controlled based on their positions relative to the corneal image (e.g. whether or not falling within and/or affecting the FoV within the corneal image). However, in other alternative or additional embodiments, the controller 9 may be configured to control the lighting devices based on one or more other properties detected from the scene reflected in the corneal image.

For example, in one embodiment, the corneal image can be used to determine whether any of the lights are blinding, and therefore should be dimmed. E.g. a threshold intensity may be set above which the light would be uncomfortable or harmful to an average or representative user, and the controller 9 may be configured such that if it detects any lighting devices 4 in the reflected scene (or any point in the scene) it will act to dim down the offending lighting devices 4 until the threshold is no longer breached.

In another example, the new light setting may be automatically derived based on the contrast present in the scene reflected form the cornea 18. In this case the controller 9 may be configured to adapt the lighting devices until the contrast (and hence glare) falls below a certain characterised level. E.g. when automatically adapting the contrast in a scene, the contrast of the image in a scene may be computed, and lighting devices 4 which fall outside of a defined maximum contrast ratio identified. A new illumination setting may then be computed for the outlying lighting devices such that the overall contrast ratio of the scene is reduced. A new setting for the lighting devices is thus computed automatically to limit the maximum contrast visible in the cornea 18 of the user 6.

In yet another example, the new illumination setting may be computed according to light setting associated with an object detected in the user's corneal image or FoV. For example, the user 6 may specify in the light map 11 a certain object or type of object that is of interest to him or her, and the controller 9 is configured to turn ON or up, or OFF or down, one or more of the lighting devices 4 when that object is detected in the reflection from the user's cornea 18 (based on an image recognition algorithm). E.g. this technique could be used to automatically illuminate a lost item the user 6 is looking for, or to automatically dim down the room lighting when the user 6 is watching television.

For multiple users, an arbitration algorithm may be used to adapt the settings of each lamp such that the preference of each user is considered in the setting of the lighting device(s) 4. Hence in embodiments, the controller 9 may be configured to identify one or more of the controllable lighting devices 4 based on a corneal image of a plurality of users, and to perform an arbitration to automatically control those of the controllable lighting devices identified based on the corneal images of the plurality of users.

For example, such an arbitration algorithm may be configured to perform the arbitration based on any one or more of the following rules. In embodiment, the arbitration algorithm may determine whether there are matching preferences for the different users. For example there are two users, each of them prefers a dim level of 40%, and so this is the dim level that is set. In embodiments, the arbitration algorithm may determine whether there are overlapping preference ranges for the different users. For example there are three users, the first user prefers a dim level between 30% and 60%, the second user prefers a dim level between 40% and 80%, and the third user prefers a dim level between 50% and a 100%, and so a dim level is selected within the overlapping range of 50% to 60%—e.g. the selection of the dim level within this range may be based on the average dim level preference over all three users. In further embodiments, the algorithm may mediate between divergent user preferences. For example a first user prefers a dim level between 20%-50% and a second user prefers a dim level between 70% and 100%, and the dim level that is set is halfway between the upper bound of the first user and the lower bound of the second user. In further embodiments, the algorithm may request user feedback to solve differences between preferences, e.g. request users to adapt their preferences. In yet further embodiments, the algorithm may prioritize user preferences based on ranking, e.g. a user that is in his home location has preferences over a user that is a guest at that location. These are merely some examples. The user preferences can relate to dim level, light colour, area to be lighted, etc.

It will be appreciated that the above embodiments have been described only by way of example. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller for controlling a plurality of lighting devices to emit light for illuminating an environment, each in dependence on at least one respective setting, the controller being configured to perform operations of:
    obtaining a corneal image, captured by a camera, formed by light reflected into the camera from at least a portion of at least one cornea of a user;
    identifying, based on the emitted light from said lighting devices, all of the plurality of lighting devices which appear within and/or affect the corneal image;
    based on which of the identified lighting devices appear within and/or affect the corneal image, automatically determining updates to the respective settings of one or more of the identified lighting devices;
    controlling said one or more identified lighting devices in accordance with the updates; and
    repeating said obtaining, determining and controlling, as the user moves such that the corneal image changes, so as to dynamically adapt the settings of the identified lighting devices.

2. The controller of claim 1, wherein said determining comprises:
 automatically determining the updates to the respective settings based on a position of the one or more lighting devices relative to corneal image.

3. The controller of claim 2, wherein said determining in dependence on position comprises:
 automatically determining the updates to the respective settings of the one or more lighting devices in dependence on whether the one or more lighting devices directly appear in the corneal image.

4. The controller of claim 3, wherein the updates comprise:
 setting to ON, or a first light output level, any of the lighting devices inside the corneal image, field of view or central region; and setting to OFF, or a second light output level lower than the first level, any of the lighting devices outside the corneal image, field of view or central region respectively.

5. The controller of claim 3, wherein the updates comprise maintaining constant values for the settings of any of the lighting devices currently appearing in the corneal image, field of view or central region as the user moves, and/or maintaining constant values for the settings of any of the lighting devices currently contributing to the light in the corneal image, field of view or central region as the user moves.

6. The controller of claim 2, wherein said determining in dependence on position comprises: automatically determining the updates to the respective settings of the one or more lighting devices in dependence on whether the one or more lighting devices indirectly contribute to the light forming the corneal image.

7. The controller of claim 2, wherein the controller is configured to determine a field of view of the user within the corneal image, and said determining in dependence on position comprises:
 automatically determining the updates to the respective settings of the one or more lighting devices in dependence on whether appearing inside the field of view, and/or in dependence on whether the one or more lighting devices contribute to the light inside the field of view.

8. The controller of claim 7, wherein the user's field of view comprises a central region and a peripheral region, and said determining in dependence on position comprises:
 automatically determining the updates to the respective settings of the one or more lighting devices in dependence on whether appearing inside the central region, and/or in dependence on whether the one or more lighting devices contribute to the light inside the central region.

9. The controller of claim 7 wherein the user's field of view comprises a central region and a peripheral region, and said determining in dependence on position comprises:
 automatically determining the updates to the respective settings of the one or more lighting devices in dependence on whether appearing in the peripheral region, and/or in dependence on whether the one or more lighting devices contribute to the light inside the peripheral region.

10. The controller of claim 1 wherein said determining comprises one or more of:
 automatically determining the updates in response to detection of a predetermined object appearing in the corneal image, field of view or central region;
 automatically determining the updates based on a measure of contrast measured in the corneal image, field of view or central region; and/or
 automatically reducing the intensity of one or more the lighting devices in response to detecting that the intensity in the corneal image, field of view or central region is a above a threshold.

11. The controller of claim 1, wherein:
 the controller is arranged to read one or more preconfigured lighting control rules from a database, the lighting control rules being preconfigured by a user; and
 the updates to be applied are determined in accordance with the one or more preconfigured lighting control rules.

12. The controller of claim 1, wherein the controller is configured to identify each respective one of the one or more lighting devices based on one or more of:
 a coded light signal emitted by the respective lighting device,
 a spectrum of the respective lighting device, and/or
 a position of the respective lighting device.

13. A system comprising the controller of claim 1, the camera and the arrangement of one or more controllable lighting devices.

14. A method of controlling a plurality of lighting devices to emit light for illuminating the environment, each in dependence on at least one respective setting, the method being performed by a controller and comprising:
 obtaining a corneal image, captured by a camera, formed by light reflected into the camera from at least a portion of at least one cornea of a user;
 identifying, based on the emitted light from said lighting devices, all of the plurality of lighting devices which appear within and/or affect the corneal image;
 based on which of the identified lighting devices appear within and/or affect the corneal image, automatically determining updates to the respective settings of one or more of the identified lighting devices;
 controlling said one or more identified lighting devices in accordance with the updates; and
 repeating said obtaining, determining and controlling, as the user moves such that the corneal image changes, so as to dynamically adapt the settings of the lighting devices as the user moves.

15. A non-transitory computer program for controlling a plurality of lighting devices to emit light for illuminating the environment, each in dependence on at least one respective setting, the computer program product comprising code embodied in one or more computer-readable storage media and configured so as when executed on one or more processors to perform operations of:
 receiving a corneal image, captured by a camera, formed by light reflected into the camera from at least a portion of at least one cornea of a user;
 identifying, based on the emitted light from said lighting devices, all of the plurality of lighting devices which appear within and/or affect the corneal image;
 based on which of the identified lighting devices appear within and/or affect the corneal image, automatically determining updates to the respective settings of one or more of the identified lighting devices;
 controlling said one or more identified lighting devices in accordance with the updates; and
 repeating said receiving, determining and controlling, as the user moves such that the corneal image changes, so as to dynamically adapt the settings of the lighting devices.

* * * * *